United States Patent
Thom et al.

(10) Patent No.: US 10,440,006 B2
(45) Date of Patent: Oct. 8, 2019

(54) DEVICE WITH EMBEDDED CERTIFICATE AUTHORITY

(71) Applicant: Microsoft Technology Licensing, LLC, Redmond, WA (US)

(72) Inventors: Stefan Thom, Snohomish, WA (US); Robert Karl Spiger, Seattle, WA (US); Dennis Mattoon, Kirkland, WA (US); Paul England, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/629,139

(22) Filed: Jun. 21, 2017

(65) Prior Publication Data
US 2018/0375852 A1 Dec. 27, 2018

(51) Int. Cl.
*H04L 29/06* (2006.01)
*G01G 19/44* (2006.01)
(Continued)

(52) U.S. Cl.
CPC ......... *H04L 63/0823* (2013.01); *G01G 19/44* (2013.01); *G06F 21/577* (2013.01); *H04L 9/3268* (2013.01); *H04L 63/0272* (2013.01); *H04L 63/0435* (2013.01); *H04L 63/0442* (2013.01); *H04L 63/061* (2013.01); *H04W 12/12* (2013.01); *G06F 8/65* (2013.01);
(Continued)

(58) Field of Classification Search
CPC .................................................. H04L 63/0823
USPC ....................................................... 713/156
See application file for complete search history.

(56) References Cited

U.S. PATENT DOCUMENTS

| 4,799,258 A | 1/1989 | Davies |
| 5,343,527 A | 8/1994 | Moore |

(Continued)

FOREIGN PATENT DOCUMENTS

| CA | 2597209 A1 | 10/2008 |
| CN | 106899583 A | 6/2017 |

(Continued)

OTHER PUBLICATIONS

"AllJoyn™ Security 2.0 Feature High-Level Design", Retrieved from: https://web.archive.org/web/20170730231028/https://allseenalliance.org/framework/documentation/learn/core/security2_0/hld, Aug. 29, 2017, 53 Pages.

(Continued)

*Primary Examiner* — Longbit Chai
(74) *Attorney, Agent, or Firm* — Holzer Patel Drennan

(57) ABSTRACT

A smart device, connected device, Internet of Things (IoT) device, etc. is configured with an embedded certificate authority. The embedded certificate authority generates a compound certificate that is signed at least by a manufacturer certificate securely stored on the device. The compound certificate includes a representation of a state of the device, which is based on one or more measurements of code executable on the device. The compound certificate may be used by an external device communicating with the smart device to determine whether the device is in a trusted state. Because the compound certificate is chained to a manufacturer certificate, the external device can communicate with the manufacturer (or an employed party) to determine whether the state of the device should be trusted.

20 Claims, 8 Drawing Sheets

(51) Int. Cl.
*G06F 21/57* (2013.01)
*H04L 9/32* (2006.01)
*H04W 12/12* (2009.01)
*G06F 8/65* (2018.01)
*H04W 12/10* (2009.01)

(52) U.S. Cl.
CPC ........ *H04L 63/168* (2013.01); *H04L 2209/38* (2013.01); *H04W 12/10* (2013.01)

(56) References Cited

U.S. PATENT DOCUMENTS

| | | |
|---|---|---|
| 5,666,414 A | 9/1997 | Micali |
| 5,799,086 A | 8/1998 | Sudia |
| 6,118,874 A | 9/2000 | Okamoto et al. |
| 6,141,423 A | 10/2000 | Fischer |
| 6,253,193 B1 | 6/2001 | Ginter et al. |
| 6,684,330 B1 | 1/2004 | Wack et al. |
| 6,976,163 B1 | 12/2005 | Hind et al. |
| 7,257,844 B2 | 8/2007 | Woodward |
| 7,350,072 B2 | 3/2008 | Zimmer et al. |
| 7,350,083 B2 | 3/2008 | Wells et al. |
| 7,499,551 B1 | 3/2009 | Mire |
| 7,580,521 B1 | 8/2009 | Spies et al. |
| 8,041,957 B2 | 10/2011 | Michaelis et al. |
| 8,200,988 B2 | 6/2012 | Gass et al. |
| 8,578,153 B2 | 11/2013 | Johansson et al. |
| 8,606,945 B2 | 12/2013 | Merkow et al. |
| 8,621,218 B2 | 12/2013 | Kwon et al. |
| 8,850,543 B2 | 9/2014 | Von Bokern et al. |
| 8,903,370 B2 | 12/2014 | Yerrabommanahalli et al. |
| 9,043,827 B1 | 5/2015 | Rapoport et al. |
| 9,118,486 B2 | 8/2015 | Pritikin |
| 9,306,913 B1 | 4/2016 | Volkov |
| 9,419,951 B1 | 8/2016 | Felsher et al. |
| 9,467,293 B1 | 10/2016 | Brainard et al. |
| 2002/0093915 A1 | 7/2002 | Larson |
| 2003/0084332 A1 | 5/2003 | Krasinski et al. |
| 2003/0126439 A1 | 7/2003 | Wheeler et al. |
| 2004/0127196 A1 | 7/2004 | Dabbish et al. |
| 2006/0282901 A1 | 12/2006 | Li et al. |
| 2007/0003064 A1 | 1/2007 | Wiseman et al. |
| 2008/0066095 A1 | 3/2008 | Reinoso |
| 2008/0069350 A1 | 3/2008 | Reinoso et al. |
| 2008/0162947 A1 | 7/2008 | Holtzman et al. |
| 2008/0215474 A1 | 9/2008 | Graham |
| 2009/0044015 A1 | 2/2009 | Gantman et al. |
| 2009/0208015 A1 | 8/2009 | Kamat et al. |
| 2010/0266132 A1 | 10/2010 | Bablani et al. |
| 2011/0179268 A1 | 7/2011 | Strom et al. |
| 2012/0099727 A1 | 4/2012 | Marshall et al. |
| 2012/0137137 A1 | 5/2012 | Brickell et al. |
| 2012/0173885 A1 | 7/2012 | Acar et al. |
| 2012/0255010 A1 | 10/2012 | Sallam |
| 2012/0295618 A1 | 11/2012 | Ahmavaara et al. |
| 2013/0091556 A1 | 4/2013 | Horn et al. |
| 2013/0283381 A1 | 10/2013 | Thadikaran et al. |
| 2014/0143412 A1 | 5/2014 | Martinez perea et al. |
| 2014/0281485 A1 | 9/2014 | Ganesan |
| 2015/0019875 A1 | 1/2015 | Barbiero et al. |
| 2015/0052610 A1 | 2/2015 | Thom et al. |
| 2015/0074402 A1 | 3/2015 | D'souza et al. |
| 2015/0312041 A1 | 10/2015 | Choi |
| 2016/0021635 A1 | 1/2016 | Lee et al. |
| 2016/0044012 A1 | 2/2016 | Carrer et al. |
| 2016/0054989 A1 | 2/2016 | Diebolt et al. |
| 2016/0099969 A1* | 4/2016 | Angus ................ H04L 63/0876 713/158 |
| 2016/0205078 A1 | 7/2016 | James et al. |
| 2016/0226870 A1 | 8/2016 | Chiu et al. |
| 2016/0270020 A1 | 9/2016 | Adrangi et al. |
| 2016/0294828 A1 | 10/2016 | Zakaria |
| 2016/0330182 A1 | 11/2016 | Jeon et al. |
| 2016/0342798 A1 | 11/2016 | Smith et al. |
| 2016/0379220 A1 | 12/2016 | Tunnell et al. |
| 2017/0005871 A1 | 1/2017 | Smith et al. |
| 2017/0006003 A1 | 1/2017 | Zakaria et al. |
| 2017/0024569 A1 | 1/2017 | Xing et al. |
| 2017/0024570 A1 | 1/2017 | Pappachan et al. |
| 2017/0063566 A1 | 3/2017 | Seminario et al. |
| 2017/0063811 A1 | 3/2017 | Hitchcock et al. |
| 2017/0142082 A1 | 5/2017 | Qian |
| 2018/0373881 A1 | 12/2018 | Thom et al. |
| 2018/0375655 A1 | 12/2018 | Thom et al. |
| 2018/0375665 A1 | 12/2018 | Contenti et al. |

FOREIGN PATENT DOCUMENTS

| | | |
|---|---|---|
| WO | 03098869 A1 | 11/2003 |
| WO | 2016172492 A1 | 10/2016 |
| WO | 2016200597 A1 | 12/2016 |

OTHER PUBLICATIONS

"Device Pairing Kinds Enum", Retrieved from: https://docs.microsoft.com/en-us/uwp/api/windows.devices.enumeration.devicepairingkinds, Aug. 29, 2017, 2 Pages.

"OCF Security Specification V1.0.0", Retrieved from: https://openconnectivity.org/draftspecs/OCF_Security_Specification_v1.0.0.pdf, Aug. 29, 2017, 104 Pages.

"TCG Infrastructure Working Group Reference Architecture for Interoperability (Part 1)", Retrieved From: https://trustedcomputinggroup.org/wp-content/uploads/IWG_Architecture_v1_0_r1.pdf, Jun. 16, 2005, 66 Pages.

Abelson, et al., "The Risks of Key Recovery, Key Escrow, and Trusted Third-Party Encryption", In World Wide Web Journal—Special Issue: Web Security: A Matter of Trust, vol. 2, Issue 3, Jun. 1, 1997, 20 Pages.

Feller, Thomas, "Towards Trustworthy Cyber-Physical Systems", In Publication of Springer, Aug. 25, 2014, 2 Pages.

Gallery, et al., "Trusted Mobile Platforms", In Proceedings of the Foundations of Security Analysis and Design IV, Aug. 18, 2007, 43 Pages.

Hu, Fei, "Wireless Embedded Microsystems", In Publication of CRC Press, Sep. 26, 2013, 1 Page.

Konstantinou, et al., "Cyber-Physical Systems: A Security Perspective", In Proceedings of 20th IEEE European Test Symposium, May 25, 2015, 8 Pages.

"International Search Report and Written Opinion Issued in PCT Application No. PCT/US18/033578", dated Jul. 31, 2018, 12 Pages.

"International Search Report and Written Opinion Issued in PCT Application No. PCT/US18/033579", dated Jul. 24, 2018, 14 Pages.

"International Search Report and Written Opinion Issued in PCT Application No. PCT/US18/033580", dated Jul. 30, 2018, 12 Pages.

"International Search Report and Written Opinion Issued in PCT Application No. PCT/US18/033581", dated Aug. 23, 2018, 12 Pages.

Green, Matthew, "Multiple encryption", https://blog.cryptographyengineering.com/2012/02/02/multiple-encryption/, Published on: Feb. 2, 2012, 6 pages.

Arthur et al., "A Practical Guide to TPM 2.0, Using the Trusted Platform Module in the New Age of Security", In Master Security Concepts Using TPM 2.0, Aspress Open, Originally published on Jan. 24, 2015, 375 pages.

Wang, Yingmei, "Middleware Technology Research and Interface Design Based on Internet of Things", In International Journal of Smart Home, vol. 9, No. 12, Dec. 30, 2015, pp. 35-44.

Does F-Secure KEY use double encryption to protect my KEY data?, https://community.f-secure.com/t5/F-Secure-KEY/Does-F-Secure-KEY-use-double/ta-p/80971, Retrieved on: Apr. 18, 2017, 2 pages.

"Non Final Office Action Issued in U.S. Appl. No. 15/629,114", dated Feb. 26, 2019, 10 Pages.

"Non Final Office Action Issued in U.S. Appl. No. 15/629,086", dated Apr. 5, 2019, 14 Pages.

"Non Final Office Action Issued in U.S. Appl. No. 15/629,064", dated Apr. 18, 2019, 14 Pages.

(56) References Cited

OTHER PUBLICATIONS

"Final Office Action Issued in U.S. Appl. No. 15/629,114", dated May 30, 2019, 12 Pages.

* cited by examiner

DEVICE WITH EMBEDDED CERTIFICATE AUTHORITY

BACKGROUND

Smart devices, connected devices, Internet of Things (IoT) devices, etc. are increasingly configured with sensors, electronics, networking capabilities, and software to provide enhanced user experiences. These devices are sometimes issued certificates by the manufacturer of the devices or by a certificate authority employed by the manufacturer. These manufacturer certificates may be used by external devices to establish secure communication channels.

SUMMARY

In at least one implementation, a device includes a trusted computing manager configured to access secure memory, a manufacturer certificate stored in the secure memory accessible the trusted computing manager. The device further includes a certificate authority embedded in the trusted computing manager. The certificate authority is operable to generated a compound certificate. The generated compound certificate includes a representation of a state of the device and is chained at least to the manufacturer certificate stored in the secure memory. The state of the device is based at least on one or more measurements of code executable on the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Figure 1:
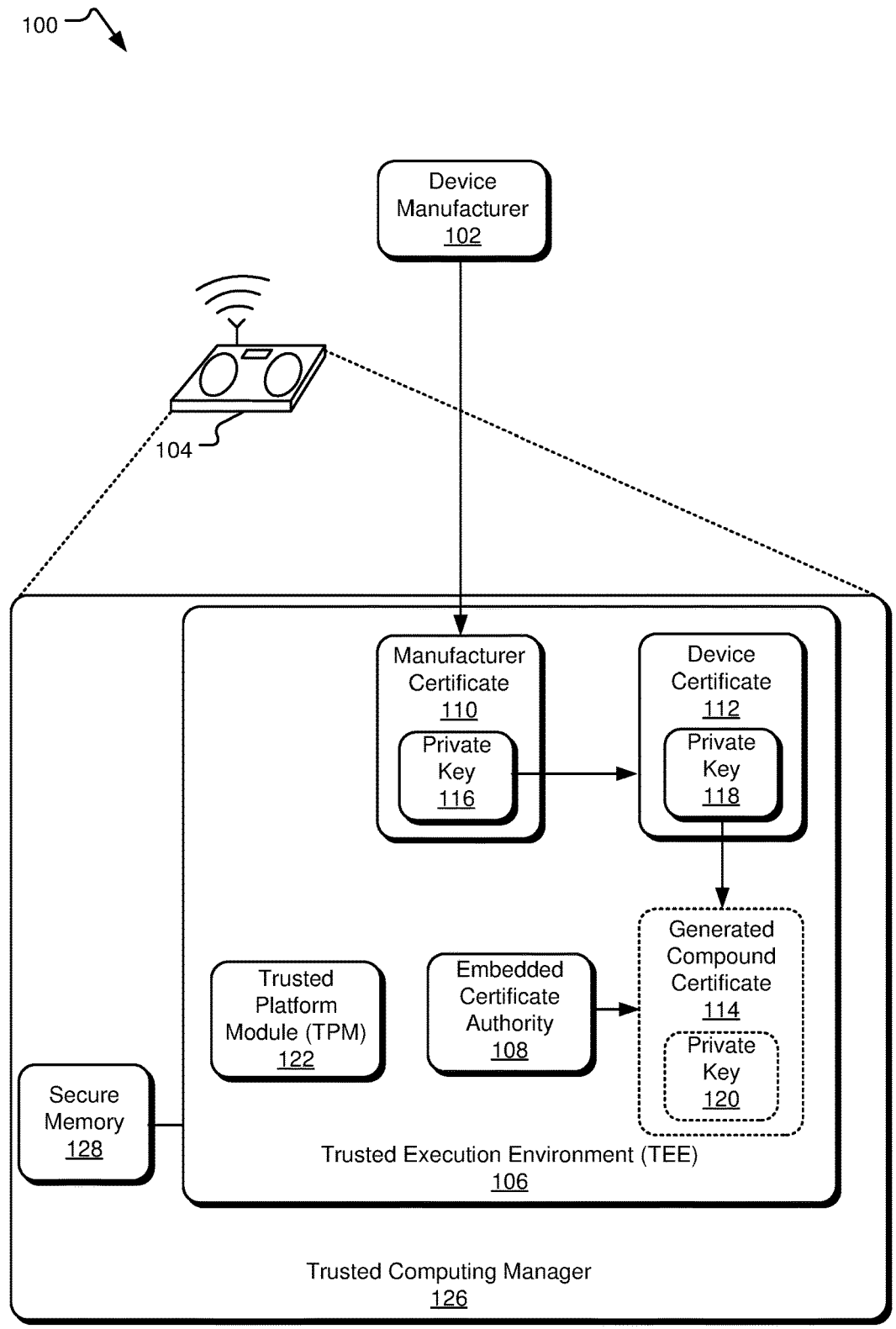
FIG. 1 illustrates an example block diagram of a device with an embedded certificate authority.

Devices are increasingly configured with sensors, electronics, and network capabilities to provide enhanced user experiences. Such devices utilize different software/firmware, applications, etc. to provide these enhanced experiences, and the devices are sometimes referred to as "smart devices," "connected devices," or "Internet of Things (IoT) devices." Because such devices include different sensors, electronics, networking capabilities, operating systems, and firmware, the devices are frequently updated to patch security holes or bugs, provide new functionality experience, etc. Furthermore, because the devices are configured with "smart" capabilities, the devices are prone to security breaches through malware or hacking, which may expose user data to bad actors.

Such devices are sometimes issued certificates by the manufacturer of the devices or by a certificate authority (CA) employed by the manufacturer. The certificates may be used by an external server or device (hereinafter "external device") communicating with the device to establish a secure communication channel (e.g., using SSL/TLS communication standards). Such manufacturer issued certificates are static, because the certificates represent a "state" of the devices when the devices are manufactured. Accordingly, the external device attempting communication with a smart device does not know whether a device is in a trusted state based on the manufacturer certificate. In other words, device may not be executing a current trusted software or firmware version or may be compromised with malware.

Attestation services or servers employed by or associated with the manufacturer may be utilized to determine whether a device is executing trusted software or firmware. An attestation service may request that a device (e.g., through a communication network) to send a code measurement to the attestation service. The attestation service may compare the received code measurement to stored code measurements to determine whether the software components are in a known trusted state. If the code is not current or trustworthy, the attestation service may send an update to the device. The attestation services are configured to analyze specific devices that are configured to communicate with the attestation services. However, direct communication with attestation services may not be practical or available for smart devices in some circumstances. For example, a smart device may not be continuously connected to a communication network to receive updates and perform attestation. Further, when an external device attempts to communicate with such a smart device, the external device may not be configured to determine whether the device's software components are in a known trusted state.

The technology described herein provides smart devices, connected devices, or Internet of Things (IoT) devices that include an embedded certificate authority. When a described device is booted, the device generates measurements of the software components on the device (e.g., operating system, firmware, user applications). The generated measurements represent a current state of the device and are included in a compound certificate generated by the embedded certificate authority. The generated compound certificate is chained to (e.g., signed by) a device certificate and/or a manufacturer certificate stored in the device. Accordingly, when an external device attempts secure communication with the device, the external device receives the generated compound certificate. The external device attempts verification of the generated compound certificate, which inherently includes verifying the chained certificates. When the external device attempts verification of the chained manufacturer certificate, the external device is linked to the manufacturer or a service employed by the manufacturer that may analyze the code measurements included in the generated compound certificate to determine whether the code measurements represent a trusted state of the device. If the device is in a trusted state, the generated compound certificate is verified, and the external device and the device can establish a secure communication channel. Accordingly, the generated compound certificate performs as a device attestation mechanism, even if the device may not be connected to a network.

In some example implementations, the external device determines that the state is an untrusted state during the certificate validation process. In such scenarios, the manufacturer or service employed by the manufacturer that is reached during the validation process sends a payload to the external device that is attempting communication with the smart device. The payload is sent to the smart device and includes software/firmware updates that are configured to adjust the smart device to a trusted state. The smart device may reboot and generate another compound certificate. The compound certificate may be verified and the external device and smart device can establish a secure communication channel.

The external device may cache (e.g., locally or remotely), the chained certificates. As such, when the device subsequently communicates with the smart device or another device, then the cached certificates can be used to determine whether the device state is a trusted state. Furthermore, the external device may cache updates received for untrusted devices. These updates may be sent to other devices storing untrusted executable code. These and other implementations are described below with respect to the figures.

FIG. 1 illustrates an example block diagram 100 of a device 104 with an embedded certificate authority 108. The block diagram 100 further includes a device manufacturer 102. The device manufacturer 102 manufacturers one or more internet of things (IoT) devices. Example IoT devices include smart appliances (e.g., refrigerators, stoves, ovens, scales, washers, dryers, toasters, blenders coffee makers, juices), smart light bulbs, smart electrical plugs, entertainment systems, smart doorbells, printers, etc. These devices are sometimes referred to as "connected devices" or "smart devices" because they are generally configured with sensors, electronics, and networking capabilities. The devices are configured to connect to one or more networks, such as the internet, an intranet, a local area network (LAN), wide area network (WAN), cellular network (e.g., 3G, 4G, LTE), one or more other devices, etc. In the illustrated implementation, the device 104 manufactured by the device manufacturer 102 is a smart scale, but it should be understood that the described implementations are applicable to other devices. The smart scale may be configured to upload/download user data (e.g., measured weight, body mass index), upload user data to a health tracking service, download user applications, etc.

The device 104 includes a trusted computing manager 126, which acts as an interface between a trusted execution environment (TEE) 106 (or a trusted platform module (TPM) 122) and other software (not shown) executable on the device, such as an operating system, firmware, user applications, etc. The TPM 122 may be a microcontroller, such as a discrete silicon component in a semiconductor package, an integrated component incorporated in one or more semiconductor packages, or the TPM 122 may be a firmware based TPM running in the TEE 106 on a general-purpose system on chip (SoC). In the illustrated implementation, the TPM 120 is a firmware based TPM executed in the TEE 106. However, it should be understood that the TPM 120 may be a microcontroller executed in a trusted computing manager 126. The instructions for TEE 106 may be stored in read only memory (ROM) or write once read many memory (WORM). Furthermore, any keys may be stored in secure memory of the TPM 122 or secure memory controlled by the TEE 106 and/or the trusted computing manager 126 (e.g., a secure memory 128). It should be understood that the trusted computing manager 126 encompasses the TEE 106 that executes the TPM 120, or a chip-based TPM with its own secure memory.

When the device manufacturer 102 manufactures the devices, the device manufacturer 102 issues a manufacturer certificate and a device certificate and installs an embedded certificate authority in each device. For example, the device manufacturer 102 issues a manufacturer certificate 110 and a device certificate 112 to the device 104, and installs an embedded certificate authority 108 in the device 104. The issued manufacturer certificate 110 and the device certificate 112 are stored in a non-volatile storage of the device. The manufacturer certificate 110, the device certificate 112, and the embedded certificate authority are accessible by and managed in the trusted execution environment (TEE) 106 (or the trusted computing manager 126) of the device 104. The manufacturer certificate 110 and the device certificate 112 are associated with public keys (not shown) used to identify and verify the certificates and any chained certificates. Furthermore, the manufacturer certificate 110 and the device certificate 112 may be X.509 certificates.

The manufacturer certificate 110 may be issued by a certificate authority (CA) of the manufacturer or by a trusted root certificate authority employed by the device manufacturer 102. The manufacturer certificate 110 includes and certifies manufacturer identifying information, such as a name of the device manufacturer 102, a public key associated with the device manufacturer 102, public key type, etc. The private key of the device manufacturer 102 is used to sign the manufacturer certificate 110, and the public key of the device manufacturer 102 is used to verify the manufacturer certificate 110. This private key signature acts as a root of trust for the device manufacturer 102. Thus, any devices, servers, etc. that communicate with the device 104 can "trust" that the device 104 is manufactured by the device manufacturer 102. The manufacturer certificate 110 is associated with a private key 116 that may be stored in a secure location within the device (e.g., a trusted platform module (TPM) 122). The private key 116 is used to sign any certificates that are chained to the manufacturer certificate 110 (e.g., the device certificate 112).

The device certificate 112 is a unique identifier used to authenticate the device. The device certificate 112 contains and certifies device identifying information, such as device type (e.g., smart scale), a serial number, hardware information (e.g., processor type), hardware capabilities, etc. The device certificate 112 is signed by the private key 116 of the manufacturer certificate 110 and is thus chained to the manufacturer certificate. Because the device certificate 112 is chained to the manufacturer certificate 110, the device certificate 112 inherits the trustworthiness of the manufacturer certificate 110. Thus, any devices, servers, etc. that may communicate with device 104 receives the device certificate 112. Because the device certificate 112 is chained to the manufacturer certificate 110, the devices, servers, etc. can communicate with the device manufacturer 102 (or using a locally or remotely cached certificate revocation list) to determine whether the device certificate can still be trusted. In other words, the device manufacturer 102 may update a certificate revocation list based on discovering a flaw in the hardware of the device 104. In some example implementations, the device certificate 112 includes a root of trust to generate different keys for different operations. The root of trust may be signed by the manufacturer certificate 110.

In various implementations, the device certificate 112 includes a measurement or representation of the TEE 106. Because processor-executable instructions for executing the TEE 106 are immutable (e.g., stored in ROM), the device certificate may certify the TEE version executable on the device 104. Accordingly, the device certificate can be used to determine whether the TEE 106 version is a trusted TEE 106.

The embedded certificate authority 108 installed in the device issues a generated compound certificate 114 each time the device 104 is booted. The generated compound certificate 114 includes measurements of mutable code executable on the device. Such code may include software, firmware, operating systems, applications, etc. The generated compound certificate 114 is signed by the private key 118 of the device certificate 112. Thus, the generated compound certificate 114 is chained to the device certificate 112 and the manufacturer certificate 110, and inherits the trustworthiness of such certificates. The issued generated compound certificate 114 may comply with X.509 certificate standards.

The code measurements for the generated compound certificate 114 may be measurements received at the TPM 122. The TPM 122 includes one or more platform configuration registers (PCRs) that store hash extended measurements of a boot sequence of the device 104. These measurements may be retrieved by the embedded certificate authority 108 to generate the compound certificate 114.

Because the generated compound certificate 114 includes a measurement of the code executable on the device, the generated compound certificate 114 includes a representation of the current "state" of the device 104. For example, if the device 104 is executing current and updated operating system and firmware, then the generated compound certificate 114 includes a representation of such a current and updated state. In contrast, if the device 104 has been compromised and the device is executing untrusted code (e.g., malware), then the measurements in the generated compound certificate 114 includes a representation of such untrusted code. If an external device or service communicates with the device 104 and the parties (e.g., device/service and the device 104) exchange certificates, then the external device/service receives the generated compound certificate 114.

The external device/service (hereinafter "external device") may not have authorization to trust the generated compound certificate 114. However, the external device analyzes the certificate chain to reach the manufacturer certificate 110. The manufacturer certificate 110 includes an identification of the device manufacturer 102 and/or the trusted root certificate authority. The external device can communicate the device manufacturer 102 (or a local or remote certificate revocation cache, or linked attestation service) to determine whether the generated compound certificate 114 is trustable. In other words, the device manufacturer 102 investigates the code measurements (e.g., device state) to determine whether the operating system, firmware, application versions are trustable. If the versions are trustable, then the external device is permitted to communicate (e.g., through a SSL, TLS, or DTLS) connection with the device 104 or initiate other cryptographic communications (e.g., use encryption keys).

If the code versions are not trustable, then the external device is not permitted to establish a communication channel with the device 104. However, because the certificate chain leads the external device to the device manufacturer 102 (or another servicing party, such as a remote attestation service), the device manufacturer 102 may send the external device a payload including a software/firmware update for the device 104. The payload is sent to the device 104, and the device 104 updates the software/firmware to the current version. The external device may then establish a secure communications channel with the device 104. In some example implementations, the device manufacturer 102 informs the external device of the location of the payload (with the updated software/firmware), which is then retrieved by the external device and sent to the device 104. In some implementations, the generated compound certificate (or one of the chained certificates) includes a link or pointer to a location where an updated version of the software/firmware of the device is retrievable. Other methods for updating the device 104 are contemplated, such as, for example, informing a user to update the device 104 using a USB stick. As such, the device 104 is updatable without having a network connection.

Accordingly, the generated compound certificate 114 performs as device attestation information. Furthermore, because the generated compound certificate 114 is chained to the device certificate 112 and the manufacturer certificate 110, the external device inherently recognizes what to do with the attestation information (e.g., communicate with the device manufacturer 102 or the issuing certificate authority to determine whether code version is current).

In some example implementations, the embedded certificate authority 108 is configured to limit the type of certificate that it issues for the generated compound certificate 114. For example, embedded certificate authority 108 is configured to define a purpose of a public key (not shown) certified by the generated compound certificate 114. Example key purposes include, without limitation, digital signatures, non-repudiation, key decipherment, data decipherment (e.g., encryption of user data), key agreement, certificate signing, encipher only, decipher only, TLS web server authentication, TLS web client authentication, signing executable code, time stamping, etc. In some implementations, the generated compound certificate 114 does not issue a SSL server authentication certificate. In other words, the public key associated with the generated compound certificate 114 is not used as for TLS/SSL server authentication, because it is undesirable for the device 104 to perform as a device manufacturer 102 authorized web service.

Figure 2:
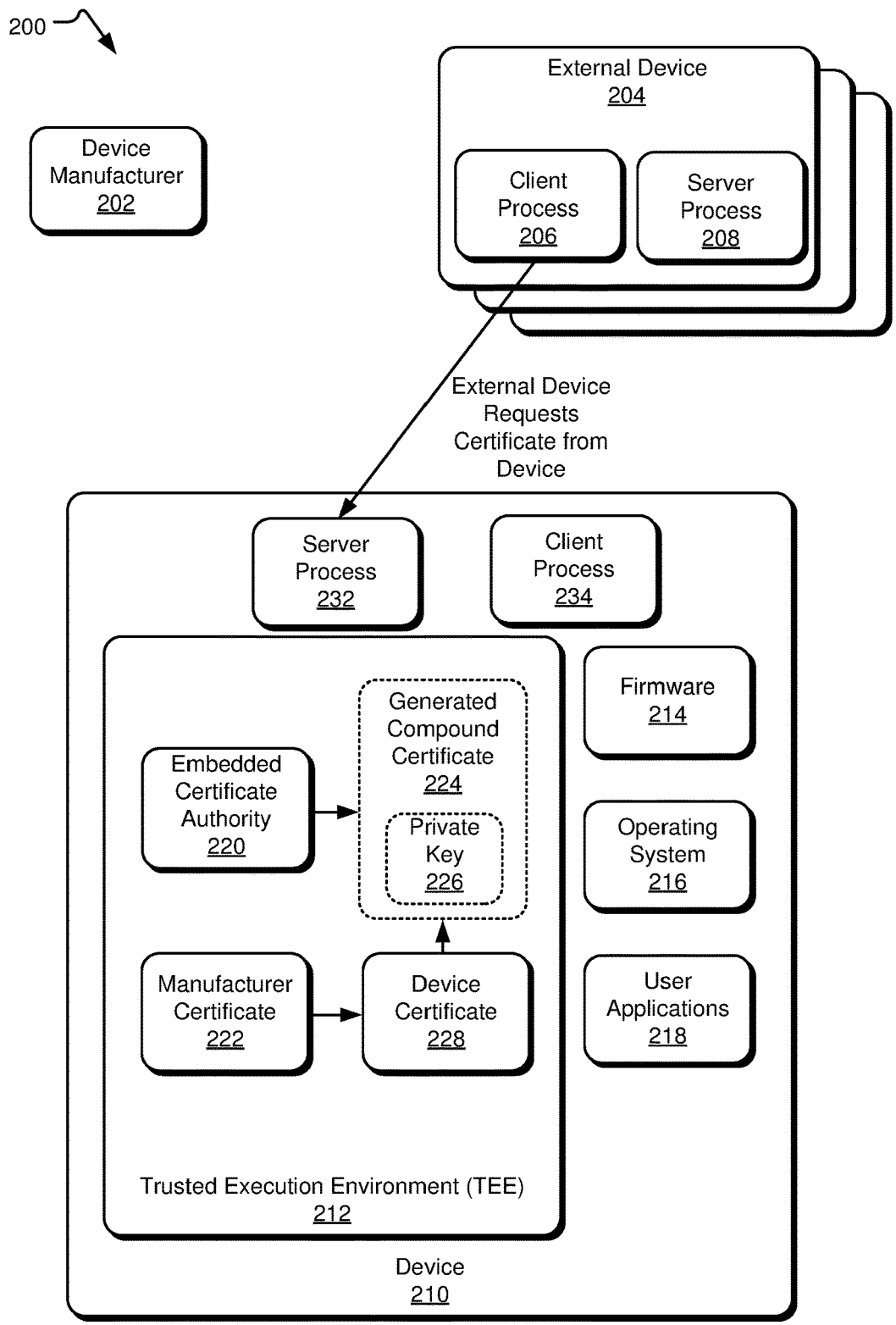
FIG. 2 illustrates another example block diagram of a device with an embedded certificate authority.

FIG. 2 illustrates another example block diagram 200 of a device 210 with an embedded certificate authority 220. The device 210 is manufactured by a device manufacturer 202, and the device manufacturer 202 issues (e.g., through a certificate authority (CA) of the device manufacturer 202 or through an employed CA) a manufacturer certificate 222 to the device 210 when the device 210 is manufactured. The manufacturer certificate 222 is issued with a public key (not shown) and includes device manufacturer 202 identifying information. The manufacturer certificate 222 may be signed by a key of the device manufacturer 202. The device 210 further includes a device certificate 228, which includes certified device information, such as, for example, device type, processor type, etc. The device certificate 228 may also certify a version of a trusted execution environment (TEE) 212 executable on the device. For example, the processor executable instructions for the TEE 212 are stored in read only memory (ROM) (not shown) or write once, read many (WORM) memory. Thus, the instructions for the TEE 212 are immutable and certified by the device certificate 228. The device certificate 228 is chained to, or signed by, the manufacturer certificate 222.

Each time the device 210 is booted, the embedded certificate authority 220 issues a generated compound certificate 224. The generated compound certificate 224 includes measurements of mutable code executable on the device.

Such code may include code for executing firmware 214, an operating system 216, any user applications 218, a server process 232, and/or a client process 234. Such measurements represent a "state" of the device 210 or versions of code executable on the device 210.

An external device 204 is attempting communication with the device 210. The external device 204 may be, for example, a provisioning service or a user device, such as a mobile phone, laptop, desktop, etc. The provisioning service is a server configured to provision devices, such as the device 210. Provisioning a device includes, for example, providing software/firmware updates, configuration information, user applications, etc. to the device 210. The provisioning service may be attempting to communicate with the device 210 to provide such updates or data. If the external device 204 is a user device, then the external device 204 may be attempting to communicate with the device 210 to retrieve user data from the device 210, provide user data to the device 210, etc. The external device 204 includes a client process 206 and a server process 208, but it should be understood that other configurations may be employed.

The client process 206 of the external device 204 issues a request to the device 210. The request may include an SSL/TLS version number, what ciphersuites the external device 204 is configured to use, and any compression methods the external device 204 is configured to use, etc. The device 210, upon receiving the request (e.g., at the server process 232 of the device), determines its own SSL/TLS version, picks a ciphersuite from one of the options sent by the external device 204, and may pick a compression method. After such parameters are selected, the device 210 sends the generated compound certificate 224 to the external device 204.

The external device 204, upon receiving the generated compound certificate 224, determines whether the certificate should be trusted. The external device 204 may not be configured to analyze the measurements included in the generated compound certificate 224 to determine whether the measurements should be trusted. Because the generated compound certificate is chained to the device certificate 228 and the manufacturer certificate 222, the external device 204 can audit any certificate revocation lists maintained by the device manufacturer 202 or another service (e.g., the provisioning service). The certificate revocation list may document certificates that include code version measurements that should not be trusted. If the generated compound certificate 224 is included in such a certificate revocation list, the device 210 is not trustable. Accordingly, a secure communication channel is not established between the external device 204 and the device 210. The external device 204 may cache (e.g., locally or remotely) any verified and unverified (e.g., untrusted) certificates. As such, when the external device 204 subsequently attempts secure communication with the device 210 or another device, the cache may be used to determine whether the device is in a trusted state.

If the generated compound certificate 224 is trustable, then the device 210 and the external device 204 continue a handshake process. The handshake process includes exchanging keys and computing the key for symmetric encryption. The client process 206 of the external device 204 may then send an encrypted and authenticated message to the server process 232 of the device 210. The server process 232 of the device may then decrypt and verify the authenticated message. The server process 232 then sends the client process 206 of the external device 204 an encrypted and authenticated message, which is decrypted and verified by the client process 206 of the external device 204. Such a process completes the handshake process and the two devices are able to communicate securely.

If the external device 204 determines that the state of generated compound certificate 224 is an untrusted state (e.g., the certificate/state is listed on a certificate revocation list cached locally, managed by the device manufacturer 202, or managed by a service employed by the device manufacturer 202), then the external device 204 may receive or retrieve a payload for the device 210. The payload includes a software/firmware update for the device 210. The payload is communicated to the device 210. The device 210 installs the update received in the payload and generates a new generated compound certificate 2224, which may be verified by the external device 204. If the new generated compound certificate is verified, the external device 204 establishes a secure communication channel with the device 210.

Figure 3:
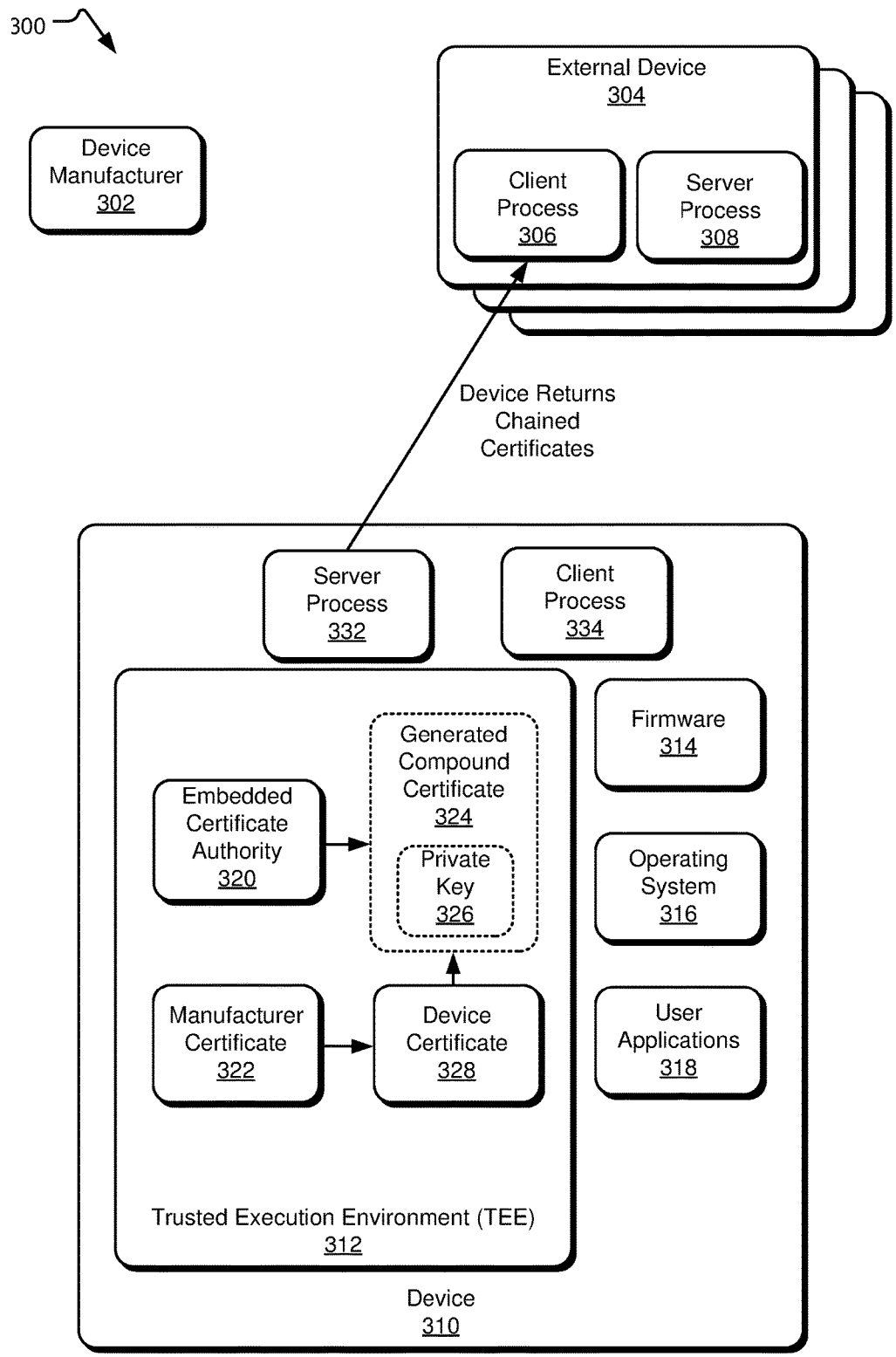
FIG. 3 illustrates another example block diagram of a device with an embedded certificate authority.

FIG. 3 illustrates another example block diagram 300 of a device 310 with an embedded certificate authority 320. The device 310 is manufactured by a device manufacturer 302, and the device manufacturer issues (e.g., through a certificate authority (CA) of the device manufacturer 302 or through an employed CA) a manufacturer certificate 322 to the device 310 when the device 310 is manufactured. The manufacturer certificate 322 is issued with a public key (not shown) and includes device manufacturer 302 identifying information. The manufacturer certificate 322 may be signed by a key of the device manufacturer 302. The device 310 further includes a device certificate 328, which includes certified device information, such as, for example, device type, processor type, etc. The device certificate 328 may also certify a version of a trusted execution environment (TEE) 312 executable on the device. For example, the processor executable instructions for the TEE 312 are stored in read only memory (ROM) (not shown) or write once, read many (WORM) memory. Thus, the instructions for the TEE 312 are immutable and certified by the device certificate 328. The device certificate 328 is chained to, or signed by, the manufacturer certificate 322.

Each time the device 310 is booted, the embedded certificate authority 320 issues a generated compound certificate 324. The generated compound certificate 324 includes measurements of mutable code executable on the device. Such code may include code for executing firmware 314, an operating system 316, any user applications 318, a server process 332, and/or a client process 334. Such measurements represent a "state" of the device 310 or versions of code executable on the device 310.

An external device 304 is attempting communication with the device 310. The external device 304 may be, for example, a provisioning service or a user device, such as a mobile phone, laptop, desktop, etc. The provisioning service is a server configured to provision devices, such as the device 310. Provisioning a device includes, for example, providing software/firmware updates, configuration information, user applications, etc. to the device 310. The provisioning service may be attempting to communicate with the device 310 to provide such updates or data. If the external device 304 is a user device, then the external device 304 may be attempting to communicate with the device 310 to retrieve user data from the device 310, provide user data to the device 310, etc. The external device 304 includes a client process 306 and a server process 308, but it should be understood that other configurations may be employed.

In FIG. 3, the client process 306 of the external device 304 has issued a request to the device 310. The request may have included an SSL/TLS version number, available ciphersuites, and potential compression methods. The device 310, upon receiving the request (e.g., at the server process 332 of the device), has determined its own SSL/TLS version, has picked a ciphersuite from one of the options sent by the external device 304, and has picked a compression method. After such parameters are selected, the device 310 sends the generated compound certificate 324 to the external device 304. The external device 304 determines whether the generated compound certificate 324 should be trusted. If the generated compound certificate 324 is trustable, the external device 304 and the device 310 establish a secure communication channel using the TLS/SSL handshake process. If the generated compound certificate 324 is not trustable, then the software (e.g., the firmware 314, the operating system 316, and/or the user applications 318) may need to be updated or the device 310 may be compromised (e.g., with malware).

If the generated compound certificate 324 is not trustable, then remedial action may be taken by the device 310, the external device 304, and/or the device manufacturer 302. Such remedial action may include sending a software/firmware update from the device manufacturer 302 (or a trusted party) through the external device 304 to the device 310. The device 310 may install the update and issue another generated compound certificate, which may be used by the external device 304 to establish a secure communication channel.

Figure 4:
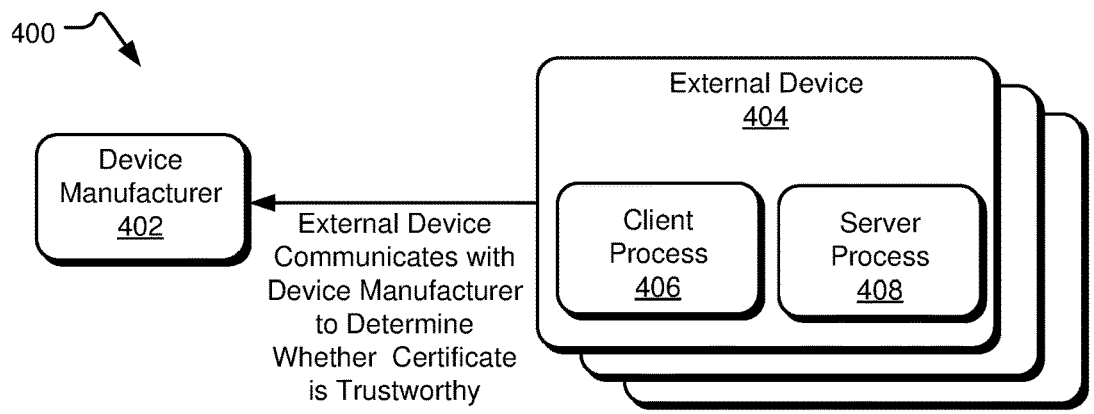
FIG. 4 illustrates another example block diagram of a device with an embedded certificate authority.
Figure 4:
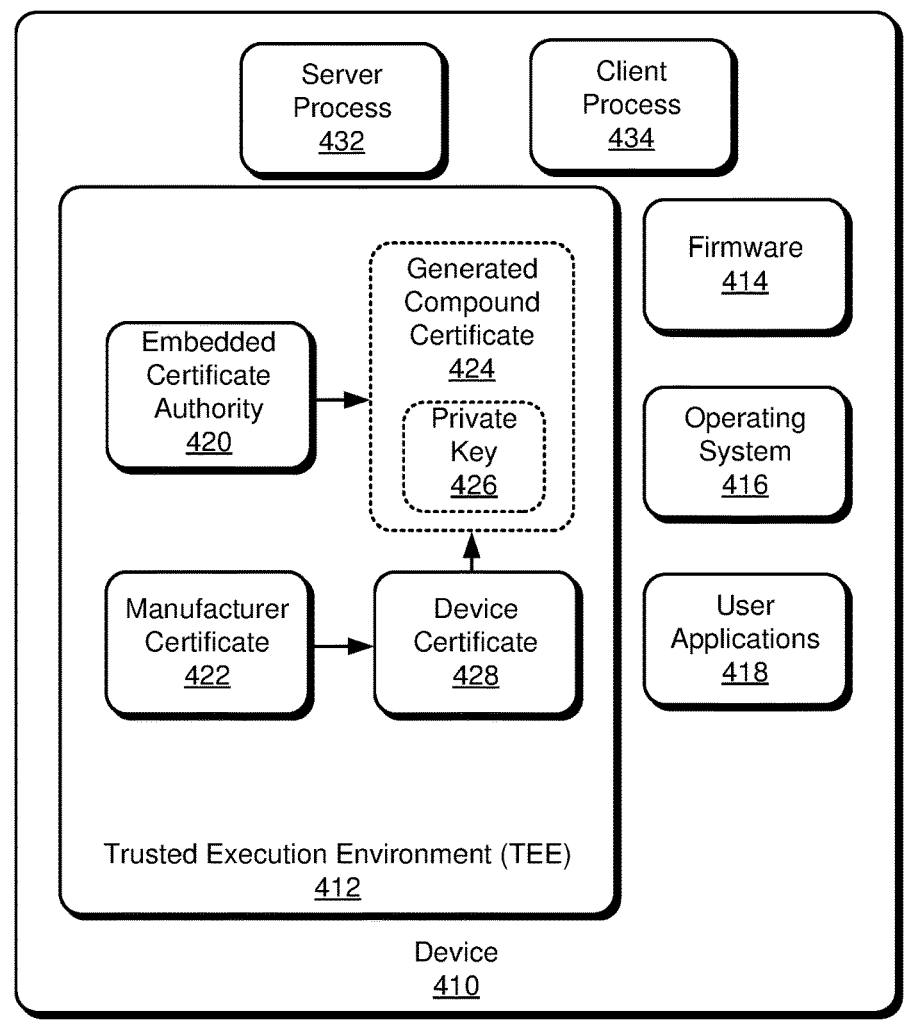

FIG. 4 illustrates another example block diagram 400 of a device 410 with an embedded certificate authority 420. The device 410 is manufactured by a device manufacturer 402, and the device manufacturer issues (e.g., through a certificate authority (CA) of the device manufacturer 402 or through an employed CA) a manufacturer certificate 422 to the device 410 when the device 410 is manufactured. The manufacturer certificate 422 is issued with a public key (not shown) and includes device manufacturer 402 identifying information. The manufacturer certificate 422 may be signed by a key of the device manufacturer 402. The device 410 further includes a device certificate 428, which includes certified device information, such as, for example, device type, processor type, etc. The device certificate 428 may also certify a version of a trusted execution environment (TEE) 412 executable on the device. For example, the processor executable instructions for the TEE 412 are stored in read only memory (ROM) (not shown) or write once, read many (WORM) memory. Thus, the instructions for the TEE 412 are immutable and certified by the device certificate 428. The device certificate 428 is chained to, or signed by, the manufacturer certificate 422.

Each time the device 410 is booted, the embedded certificate authority 420 issues a generated compound certificate 424. The generated compound certificate 424 includes measurements of mutable code executable on the device. Such code may include code for executing firmware 414, an operating system 416, any user applications 418, a server process 432, and/or a client process 434. Such measurements represent a "state" of the device 410 or versions of code executable on the device 410.

An external device 404 is attempting communication with the device 410. The external device 404 may be, for example, a provisioning service or a user device, such as a mobile phone, laptop, desktop, etc. The provisioning service is a server configured to provision devices, such as the device 410. Provisioning a device includes, for example, providing software/firmware updates, configuration information, user applications, etc. to the device 410. The provisioning service may be attempting to communicate with the device 410 to provide such updates or data. If the external device 404 is a user device, then the external device 404 may be attempting to communicate with the device 410 to retrieve user data from the device 410, provide user data to the device 410, etc. The external device 404 includes a client process 406 and a server process 408, but it should be understood that other configurations may be employed.

In FIG. 4, the client process 406 of the external device 404 has issued a request to the device 410. The request may have included an SSL/TLS version number, available ciphersuites, and potential compression methods. The device 410, upon receiving the request (e.g., at the server process 432 of the device), has determined its own SSL/TLS version, has picked a ciphersuite from one of the options sent by the external device 404, and has picked a compression method. After such parameters are selected, the device 410 sent the generated compound certificate 424 to the external device 404. The external device 404 determines whether the generated compound certificate 424 should be trusted.

Because the generated compound certificate 424 is chained to the device certificate 428 and the manufacturer certificate 422, the process of verifying the generated compound certificate 424 inherently includes verifying the chained certificates, including the manufacturer certificate 422. The information in the manufacturer certificate leads the external device 404 to the device manufacturer 402 to determine whether the generated compound certificate 424 is trustable. It should be understood that the certificate chain may lead the external device 404 to a trusted associate of the device manufacturer 402, which may be a certificate authority (CA) employed by the device manufacturer 402, an attestation server associated with the device manufacturer 402, a certificate revocation list (e.g., local or remote cache) managed by the device manufacturer 402 and/or the CA employed by the device manufacturer 402, etc. The device manufacturer 402 evaluates the device measurements (e.g., the representation of the state of the device) included in the generated compound certificate 424 to determine whether the state of the device should be trusted. Such evaluations may include comparing the measurements to measurements stored in a cache, comparing the issued generated compound certificate 424 to certificates stored in a cache, simulating expected device state to generate simulated measurements, which are compared to the measurements of the generated compound certificate, etc.

For example, in implementations utilizing transport layer security (TLS), a signature check is performed with the parent certificate public key (e.g., public key of the manufacturer certificate 422). The TLS stack may perform other implicit checks, such as key usage and chain integrity verifications. Once these checks are passed, server code may register a callback with the TLS stack that gets triggered with the pending certificate context for additional scrutiny. The outside server code is configured with parsing capabilities to parse the noncritical extensions that are specific to the operating system 416 of the device 410, such as the measurements in the generated compound certificate 424. Accordingly, the code that links the TLS stack would implement the call back attestation verification and set them when the TLS stack is initialized. It should be understood that other configurations for measurement verification may be employed.

Figure 5:
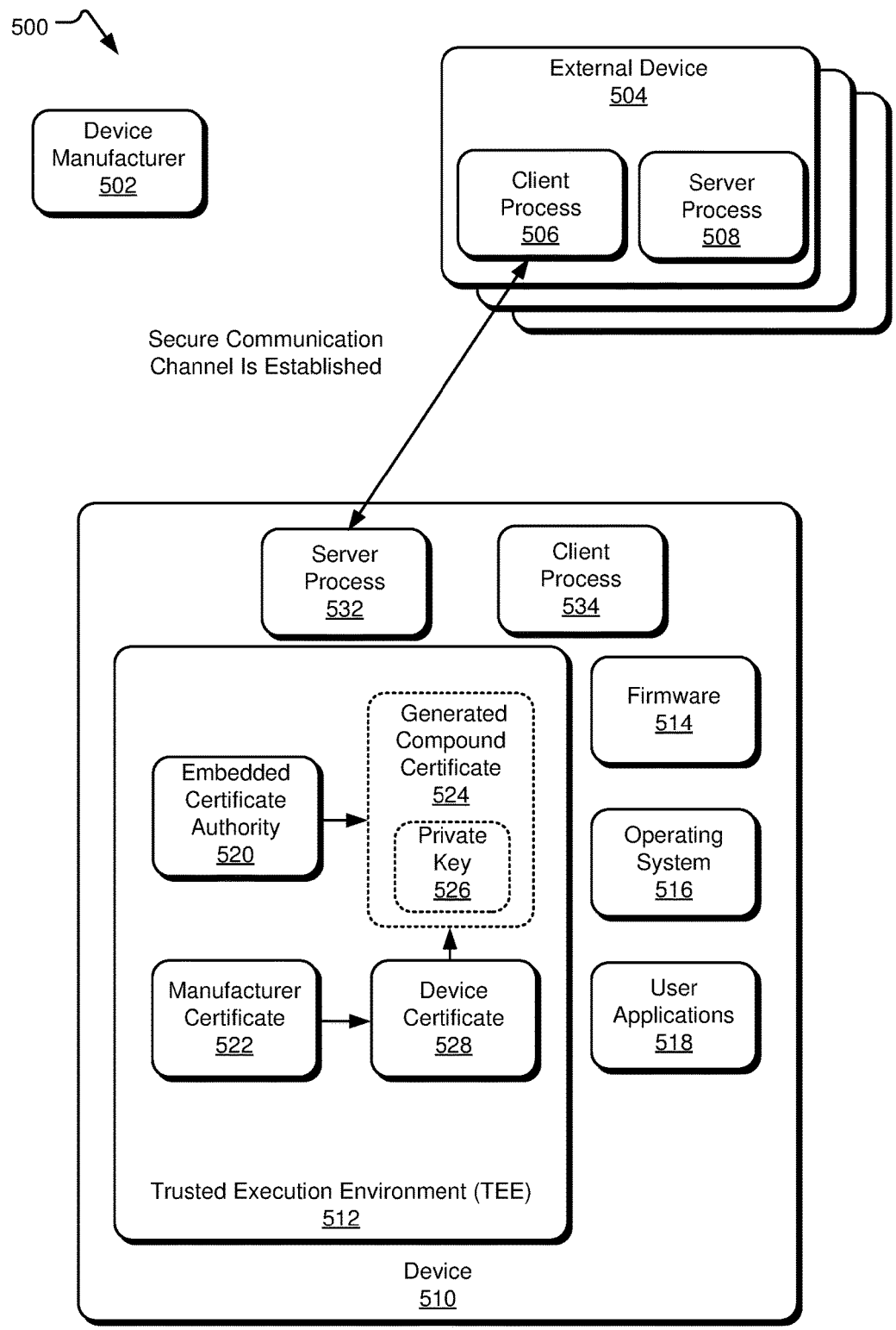
FIG. 5 illustrates another example block diagram of a device with an embedded certificate authority.

FIG. 5 illustrates another example block diagram 500 of a device 510 with an embedded certificate authority 520. The device 510 is manufactured by a device manufacturer 502, and the device manufacturer issues (e.g., through a certificate authority (CA) of the device manufacturer 502 or through an employed CA) a manufacturer certificate 522 to the device 510 when the device 510 is manufactured. The manufacturer certificate 522 is issued with a public key (not shown) and includes device manufacturer 502 identifying information. The manufacturer certificate 522 may be signed by a key of the device manufacturer 502. The device 510 further includes a device certificate 528, which includes certified device information, such as, for example, device type, processor type, etc. The device certificate 528 may also certify a version of a trusted execution environment (TEE) 512 executable on the device. For example, the processor executable instructions for the TEE 512 are stored in read only memory (ROM) (not shown) or write once, read many (WORM) memory. Thus, the instructions for the TEE 512 are immutable and certified by the device certificate 528. The device certificate 528 is chained to, or signed by, the manufacturer certificate 522.

Each time the device 510 is booted, the embedded certificate authority 520 issues a generated compound certificate 524. The generated compound certificate 524 includes measurements of mutable code executable on the device. Such code may include code for executing firmware 514, an operating system 516, any user applications 518, a server process 532, and/or a client process 534. Such measurements represent a "state" of the device 510 or versions of code executable on the device 510.

An external device 504 is attempting communication with the device 510. The external device 504 may be, for example, a provisioning service or a user device, such as a mobile phone, laptop, desktop, etc. The provisioning service is a server configured to provision devices, such as the device 510. Provisioning a device includes, for example, providing software/firmware updates, configuration information, user applications, etc. to the device 510. The provisioning service may be attempting to communicate with the device 510 to provide such updates or data. If the external device 504 is a user device, then the external device 504 may be attempting to communicate with the device 510 to retrieve user data from the device 510, provide user data to the device 510, etc. The external device 504 includes a client process 506 and a server process 508, but it should be understood that other configurations may be employed.

In FIG. 5, the client process 506 of the external device 504 has issued a request to the device 510. The request may have included an SSL/TLS version number, available ciphersuites, and potential compression methods. The device 510, upon receiving the request (e.g., at the server process 532 of the device), has determined its own SSL/TLS version, has picked a ciphersuite from one of the options sent by the external device 504, and has picked a compression method. After such parameters are selected, the device 510 sent the generated compound certificate 524 to the external device 504. The external device 504 determines whether the generated compound certificate 524 should be trusted.

Because the generated compound certificate 524 is chained to the device certificate 528 and the manufacturer certificate 522, the process of verifying the generated compound certificate 524 inherently includes verifying the chained certificates, including the manufacturer certificate 522. The information in the manufacturer certificate leads the external device 504 to the device manufacturer 502 to determine whether the generated compound certificate 524 is trustable. It should be understood that the certificate chain may lead the external device 504 to a trusted associate of the device manufacturer 502, which may be a certificate authority (CA) employed by the device manufacturer 502, an attestation server associated with the device manufacturer 502, a certificate revocation list (e.g., local or remote cache) managed by the device manufacturer 502 and/or the CA employed by the device manufacturer 502, etc. The device manufacturer 502 evaluates the device measurements (e.g., the representation of the state of the device) included in the generated compound certificate 524 to determine whether the state of the device should be trusted. Such evaluations may include comparing the measurements to measurements stored in a cache, comparing the issued generated compound certificate 524 to certificates stored in a cache, simulating expected device state to generate simulated measurements, which are compared to the measurements of the generated compound certificate, etc.

In FIG. 5, device manufacturer 502 has approved the generated compound certificate 524. In other words, the state of the device represented in the device measurements is a trustworthy state. Accordingly, the SSL/TLS handshake process continues. The handshake process may include exchanging keys and computing keys for symmetric encryption. The client process 506 of the external device 504 and the server process 532 of the device 510 exchange encrypted and authenticated messages. Each party decrypts and verifies the messages. If the messages are verified, then the device 510 and the external device 504 establish a secure communication channel.

Figure 6:
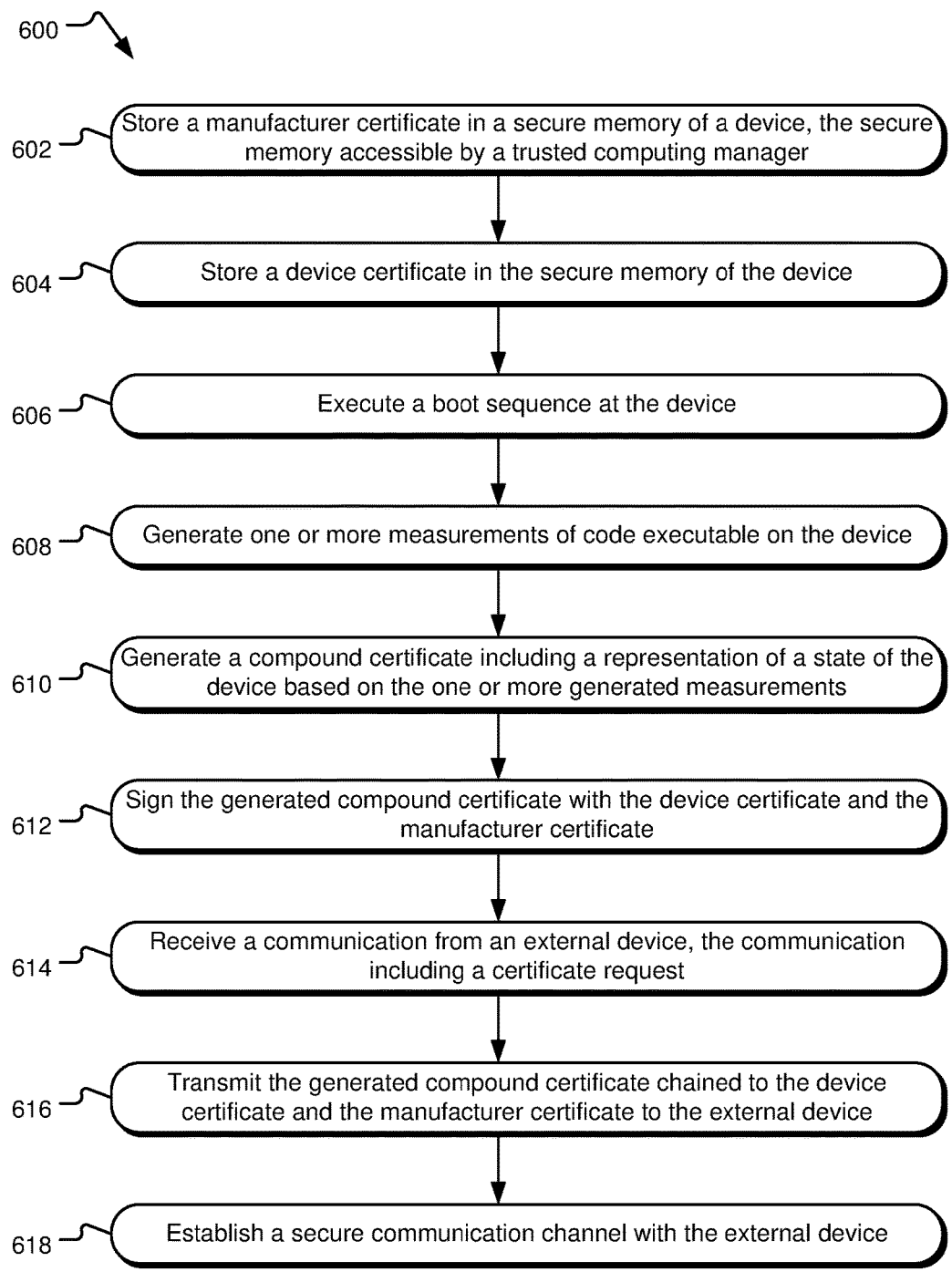
FIG. 6 illustrates example operations for generating a compound certificate in a device embedded with a certificate authority.

FIG. 6 illustrates example operations 600 for generating a compound certificate in a device embedded with a certificate authority. A storing operation 602 stores a manufacturer certificate in a secure memory of the device. The secure memory is accessible by a trusted computing manager. The trusted computing manager encompasses a trusted platform module (TPM) executed in a stand-alone chip, a trusted execution environment (TEE) that operates a trusted computing module, etc. A storing operation 604 stores a device certificate in the secure memory of the device. It should be understood that the storing operations 602 and 604 may occur when the device is manufactured. As such the device contains (e.g., stores) the manufacturer certificate and the device certificate.

An executing operation 606 executes a boot sequence of the device. The executing operation 606 may occur when the device is powered on, when the device is restarted, after the device is updated, etc. A generating operation 608 generates one or more measurements. The measurements may be stored in one or more platform configuration registers (PCRs) managed by the TPM of the device. The measurements may be digests (e.g., hash extended) measurements of the boot sequence. A generating operation 610 generates a compound certificate including a representation of a state of the device. The state of the device is represented by the one or more measurements. The generating operation 610 may be executed by a certificate authority embedded in the TEE or the trusted computing manager. A signing operation 612 signs the generated compound certificate with the device certificate and the manufacturer certificate. Private keys of the device certificate and/or the manufacturer certificate may be used to sign the generated compound certificate.

A receiving operation 614 receives a communication from an external device. The external device may be a user device, such as a desktop, laptop, mobile device or a service, such as a provisioning service, attestation service, etc. The communication includes a certificate request. A transmitting operation transmits the generated compound certificate chained to the device certificate and the manufacturer certificate to the external device. The external device may then conduct a certificate validation of the chained certificates. If the certificate is valid, an establishing operation 618 establishes a secure communication channel with the external device. The establishing operation may include performing the SSL/TLS handshake process, which includes message authentication.

Figure 7:
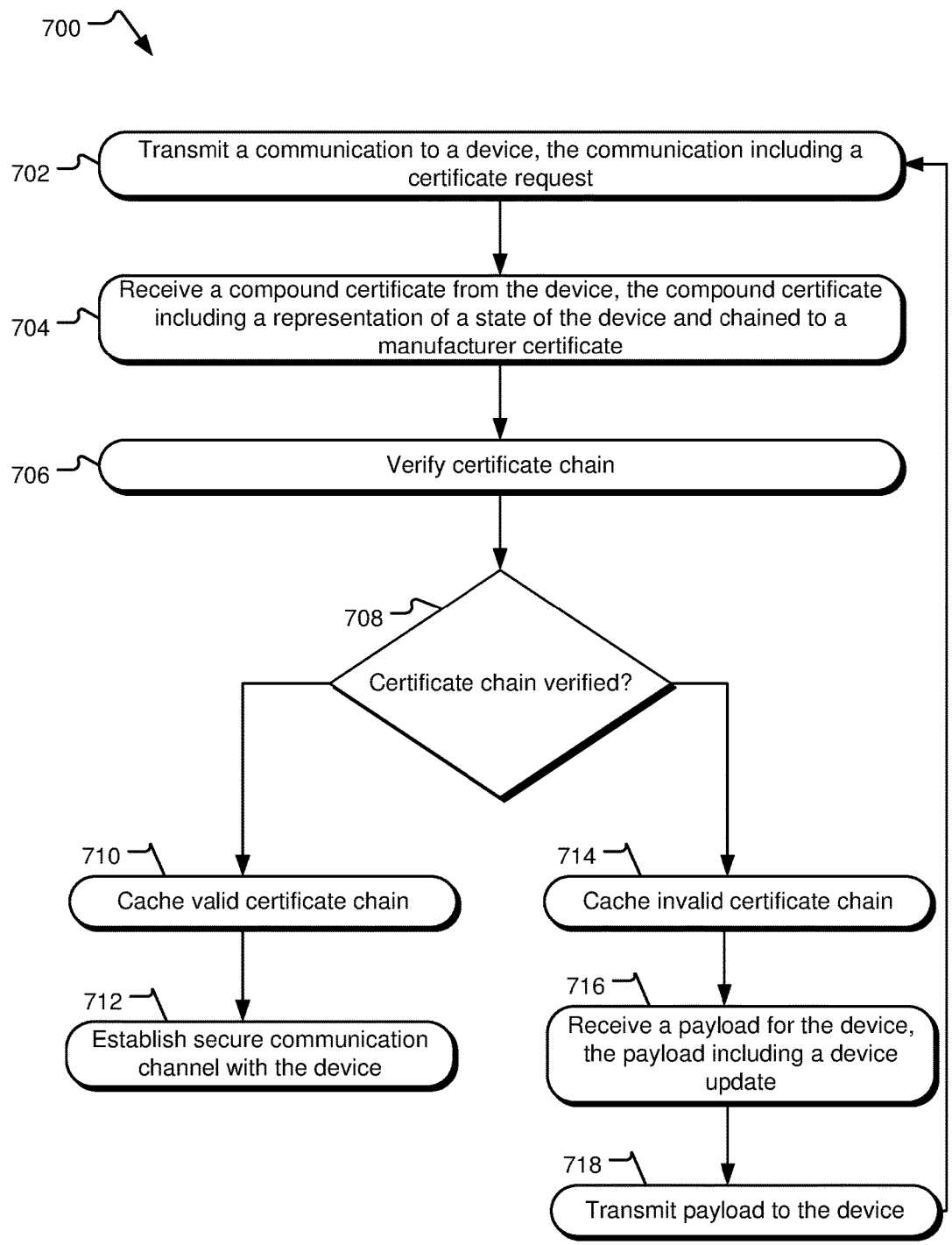
FIG. 7 illustrates example operations for communicating with a device with an embedded certificate authority.

FIG. 7 illustrates example operations 700 for communicating with a device with an embedded certificate authority. A transmitting operation 702 transmits a communication to the device. The communication includes a certificate request. A receiving operation 704 receives a compound certificate from the device. The compound certificate includes a representation of a state of the device and is chained to at least a manufacturer certificate. A verifying operation 706 verifies the certificate chain. The verifying operation 706 may include verifying a device certificate and the manufacturer certificate. The verifying operation 706 may include communicating with the manufacturer or a service employed by the manufacturer to determine whether the state of the device represented in the received compound certificate is a trusted state. A determining operation 708 determines whether the certificate chain is verified (e.g., whether the state is a trusted state). If the certificate chain is verified, then a caching operation 710 caches the valid certificate chain. The certificate chain may be cached locally and/or remotely. An establishing operation 712 establishes a secure communication channel with the device.

If the certificate chain is not valid (e.g., the device is compromised or stores an unsupported software/hardware version), then a caching operation 714 caches (e.g., locally or remotely) the invalid certificate chain. Accordingly, when the external device (e.g., the device performing the operations 700) communicates with a device with the same or similar state, the device can invalidate the chain using the cached chain. In some implementations, the external device receives, in a receive in operation 716, a payload prepared for the device. The payload includes a device update. The payload may be received from the manufacturer or a provisioning service employed by the manufacturer, etc. based on the manufacturer certificate. A transmitting operation 718 transmits the payload to the device. The device may then install the update received in the payload, and the process may then return to the transmitting operation 702, which transmits the communication to the device. The receiving operation 716 and the transmitting operation 718 allow for the external device communicating with the device to update the device to a trusted state.

Figure 8:
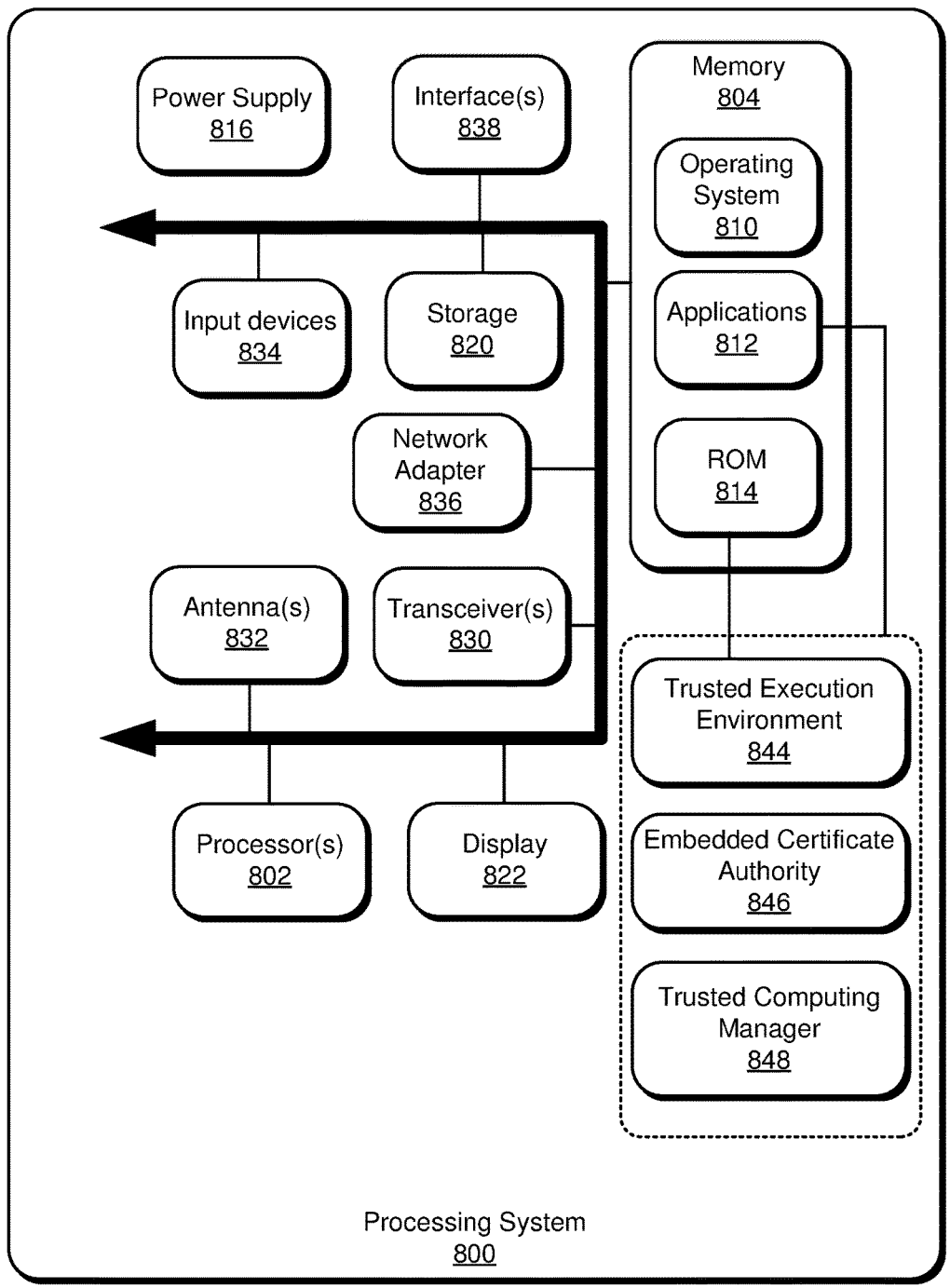
FIG. 8 illustrates an example system that may be useful in implementing the described technology.

FIG. 8 illustrates an example system (labeled as a processing system 800) that may be useful in implementing the described technology. The processing system 800 may be a client device, such as a smart device, connected device, Internet of Things (IoT) device, laptop, mobile device, desktop, tablet, or a server/cloud device. The processing system 800 includes one or more processor(s) 802, and a memory 804. The memory 804 generally includes both volatile memory (e.g., RAM) and non-volatile memory (e.g., flash memory). An operating system 810 resides in the memory 804 and is executed by the processor 802.

One or more application programs 812 modules or segments, such as a trusted execution environment 844, an embedded certificate authority 846, or a trusted computing manager 848, a trusted platform module, a client process (not shown), a server process (not shown), firmware (not shown) are loaded in the memory 804 and/or storage 820 and executed by the processor 802. In some implementations, the trusted execution environment 844 is stored in read only memory (ROM) 814 or write once, read many (WORM) memory. Data such as keys, manufacturer certificates, device certificates, trusted roots, user data, etc. may be stored in the memory 804 or storage 820 and may be retrievable by the processor 802 for use in the by the trusted execution environment 844, the embedded certificate authority, a trusted computing manager 848, the trusted platform module, etc. The storage 820 may be local to the processing system 800 or may be remote and communicatively connected to the processing system 800 and may include another server. The storage 820 may store resources that are requestable by client devices (not shown). The storage 820 may include secure storage such as one or more platform configuration registers (PCR) manages by one or more trusted platform modules (TPMs), which may be implanted in a chip or by the trusted execution environment TEE.

The processing system 800 includes a power supply 816, which is powered by one or more batteries or other power sources and which provides power to other components of the processing system 800. The power supply 816 may also be connected to an external power source that overrides or recharges the built-in batteries or other power sources.

The processing system 800 may include one or more communication transceivers 830 which may be connected to one or more antenna(s) 832 to provide network connectivity (e.g., mobile phone network, Wi-Fi®, Bluetooth®, etc.) to one or more other servers and/or client devices (e.g., mobile devices, desktop computers, or laptop computers). The processing system 800 may further include a network adapter 836, which is a type of communication device. The processing system 800 may use the network adapter 836 and any other types of communication devices for establishing connections over a wide-area network (WAN) or local-area network (LAN). It should be appreciated that the network connections shown are exemplary and that other communications devices and means for establishing a communications link between the processing system 800 and other devices may be used.

The processing system 800 may include one or more input devices 834 such that a user may enter commands and information (e.g., a keyboard or mouse). These and other input devices may be coupled to the server by one or more interfaces 838 such as a serial port interface, parallel port, universal serial bus (USB), etc. The processing system 800 may further include a display 822 such as a touch screen display.

The processing system 800 may include a variety of tangible processor-readable storage media and intangible processor-readable communication signals. Tangible processor-readable storage can be embodied by any available media that can be accessed by the processing system 800 and includes both volatile and nonvolatile storage media, removable and non-removable storage media. Tangible processor-readable storage media excludes intangible communications signals and includes volatile and nonvolatile, removable and non-removable storage media implemented in any method or technology for storage of information such as processor-readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing system 800. In contrast to tangible processor-readable storage media, intangible processor-readable communication signals may embody computer-readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

An example device includes one or more processors, a trusted computing manager executable by the one or more processors to access a secure memory, a manufacturer certificate stored in the secure memory accessible the trusted computing manager, a certificate authority embedded in the trusted computing manager and executable by the one or more processors, and a server process executable by the one or more processors. The certificate authority is executable to generate a compound certificate, the generated compound certificate including a representation of a state of the device and being chained at least to the manufacturer certificate stored in the secure memory, the state of the device being based at least on one or more measurements of code executable on the device. The server process is executable to transmit the generated compound certificate to an external device responsive to a certificate request by the external device, the representation of the state of the device included in the generated compound certificate usable by the external device to determine whether the device is in a trusted state.

Another example device of any preceding device further includes the manufacturer certificate chained to the generated compound certificate being usable by the external device to determine that the state of the device represented in the generated compound certificate is a trusted state.

Another example device of any preceding device further includes the manufacturer certificate chained to the generated compound certificate being used by the external device to determine whether the state of the device represented in the generated compound certificate is a trusted state. The server process is further executable to establish a secure communication channel with the external device, the state of the device represented in the generated compound certificate being trusted by the external device.

Another example device of any preceding device further includes the generated compound certificate being further chained to a device certificate, the device certificate including measurements of mutable code executable on the device, the measurements of the mutable code including at least measurements of code for executing a trusted execution environment.

Another example device of any preceding device further includes the public key associated with the generated compound certificate being limited in functionality by the embedded certificate authority.

Another example device of any preceding device further includes the one or more measurements of code executable on the device being generated during a boot sequence of the device.

Another example device of any preceding device further includes the device receiving a payload including a device update, the payload transmitted to the device from the external device responsive to a determination by the external device that the device is in an untrusted state based on the generated compound certificate.

An example method includes storing a manufacturer certificate in a secure memory of a device, the secure memory accessible by a trusted computing manager, generating, at the device, one or more measurements of code executable on the device, generating, at the device, a compound certificate, the compound certificate including a representation of a state of the device and being chained to at least the manufacturer certificate stored in the secure memory accessible by the trusted computing manager, the state of the device being based at least on the one or more generated measurements of code executable on the device, and transmitting the generated compound certificate to an external device, the representation of the state of the device included in the generated compound certificate used by the external device to determine whether the device is in a trusted state.

Another example method of any preceding method further includes the manufacturer certificate being chained to the generated compound certificate is used by the external device to determine whether the state of the device represented in the generated compound certificate is a trusted state.

Another example method of any preceding method further includes the manufacturer certificate chained to the generated compound certificate used by the external device to determine whether the state of the device represented in the generated compound certificate is a trusted state. The method further includes establishing a secure communication channel with the external device, the state of the device represented in the generated compound certificate being trusted by the external device.

Another example method of any preceding method further includes the generated compound certificate being further chained to a device certificate, the device certificate including measurements of mutable code executable on the device, the measurements of the mutable code including at least measurements of code for executing a trusted execution environment.

Another example method of any preceding method further includes the generated compound certificate being further chained to a device certificate, the device certificate including a representation of hardware included in the device.

Another example method of any preceding method further includes the one or more measurements of code executable on the device are generated during a boot sequence of the device.

Another example method of any preceding method further includes receiving, at the device, a payload including a device update, the payload transmitted to the device from the external device responsive to a determination by the external device that the device is in an untrusted state based on the generated compound certificate.

An example system includes means for storing a manufacturer certificate in a secure memory of a device, the secure memory accessible by a trusted computing manager, means for generating, at the device, one or more measurements of code executable on the device, means for generating, at the device, a compound certificate, the compound certificate including a representation of a state of the device and being chained to at least the manufacturer certificate stored in the secure memory accessible by the trusted computing manager, the state of the device being based at least on the one or more generated measurements of code executable on the device, and means for transmitting the generated compound certificate to an external device, the representation of the state of the device included in the generated compound certificate used by the external device to determine whether the device is in a trusted state.

An example system of any preceding system further includes means for includes the manufacturer certificate being chained to the generated compound certificate is used by the external device to determine whether the state of the device represented in the generated compound certificate is a trusted state.

An example system of any preceding system further includes means for the manufacturer certificate chained to the generated compound certificate used by the external device to determine whether the state of the device represented in the generated compound certificate is a trusted state. The method further includes establishing a secure communication channel with the external device, the state of the device represented in the generated compound certificate being trusted by the external device.

An example system of any preceding system further includes means for the generated compound certificate being further chained to a device certificate, the device certificate including measurements of mutable code executable on the device, the measurements of the mutable code including at least measurements of code for executing a trusted execution environment.

An example system of any preceding system further includes means for the generated compound certificate being further chained to a device certificate, the device certificate including a representation of hardware included in the device.

An example system of any preceding system further includes means for the one or more measurements of code executable on the device are generated during a boot sequence of the device.

An example system of any preceding system further includes means for receiving, at the device, a payload including a device update, the payload transmitted to the device from the external device responsive to a determination by the external device that the device is in an untrusted state based on the generated compound certificate.

Another example tangible processor-readable storage media embodied with instructions for executing on one or more processors and circuits of a device a process of any preceding process further includes storing a manufacturer certificate in a secure memory of a device, the secure memory accessible by a trusted computing manager, generating, at the device, one or more measurements of code executable on the device, generating, at the device, a compound certificate, the compound certificate including a representation of a state of the device and being chained to at least the manufacturer certificate stored in the secure memory accessible by the trusted computing manager, the state of the device being based at least on the one or more generated measurements of code executable on the device, and transmitting the generated compound certificate to an external device, the representation of the state of the device included in the generated compound certificate used by the external device to determine whether the device is in a trusted state.

Another example tangible processor-readable storage media embodied with instructions for executing on one or more processors and circuits of a device a process of any preceding process further includes the manufacturer certificate chained to the generated compound certificate being usable by the external device to determine whether the state of the device represented in the generated compound certificate is a trusted state.

Another example tangible processor-readable storage media embodied with instructions for executing on one or more processors and circuits of a device a process of any preceding process further includes the manufacturer certificate chained to the generated compound certificate being usable by the external device to determine whether the state of the device represented in the generated compound certificate is a trusted state. The process further includes establishing a secure communication channel with the external device, the state of the device represented in the generated compound certificate being trusted by the external device.

Another example tangible processor-readable storage media embodied with instructions for executing on one or more processors and circuits of a device a process of any preceding process further includes the generated compound certificate being further chained to a device certificate, the device certificate including measurements of mutable code executable on the device, the measurements of the mutable code including at least measurements of code for executing a trusted execution environment.

Another example tangible processor-readable storage media embodied with instructions for executing on one or more processors and circuits of a device a process of any preceding process further includes the generated compound certificate being further chained to a device certificate, the device certificate including a representation of hardware included in the device.

Another example tangible processor-readable storage media embodied with instructions for executing on one or more processors and circuits of a device a process of any preceding process further includes receiving, at the device, a payload including a device update, the payload transmitted to the device from the external device responsive to a determination by the external device that the device is in an untrusted state based on the generated compound certificate.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A computing device comprising:
one or more hardware processors;
a trusted computing manager executable by the one or more hardware processors to access a secure memory;
a certificate authority embedded in the trusted computing manager at the computing device and executable by the one or more hardware processors to generate a compound certificate, the generated compound certificate including a representation of a state of the computing device and being chained at least to a manufacturer certificate,
wherein the manufacturer certificate is received from an external certificate authority and stored in the secure memory accessible by the trusted computing manager, wherein the state of the computing device is determined based on one or more measurements of code executable on the computing device; and
a server process executable by the one or more hardware processors to transmit the generated compound certificate to an external device in response to a certificate request sent by the external device, wherein the representation of the state of the computing device included in the generated compound certificate is usable by the requesting external device to determine whether the computing device is in a trusted state.

2. The computing device of claim 1 wherein the manufacturer certificate chained to the generated compound certificate is usable by the external device to determine that the state of the computing device represented in the generated compound certificate is a trusted state.

3. The computing device of claim 1 wherein the manufacturer certificate chained to the generated compound certificate is usable by the external device to determine whether the state of the computing device represented in the generated compound certificate is a trusted state, the server process being further executable to establish a secure communication channel with the external device, the state of the computing device represented in the generated compound certificate being trusted by the external device.

4. The computing device of claim 1 wherein the generated compound certificate is further chained to a device certificate, the device certificate including measurements of mutable code executable on the computing device, the measurements of the mutable code including at least measurements of code for executing a trusted execution environment.

5. The computing device of claim 1 wherein a public key associated with the generated compound certificate is limited in functionality by the embedded certificate authority.

6. The computing device of claim 1 wherein the one or more measurements of code executable on the computing device are generated during a boot sequence of the computing device.

7. The computing device of claim 1 wherein the computing device receives a payload including a device update, the payload transmitted to the computing device from the external device responsive to a determination by the external device that the computing device is in an untrusted state based on the generated compound certificate.

8. A method comprising:
storing a manufacturer certificate in a secure memory of a computing device, the secure memory accessible by a trusted computing manager;
generating, at the computing device, one or more measurements of code executable on the computing device, the one or more measurements of code representing a state of the computing device;
generating, by a certificate authority embedded in the trusted computing manager at the computing device, a compound certificate, wherein the compound certificate includes the one or more measurements of code and is chained to at least the stored manufacturer certificate, wherein the stored manufacturer certificate is received from an external certificate authority and stored in the secure memory accessible by the trusted computing manager; and
transmitting, by the computing device, the generated compound certificate to an external device in response to a certificate request sent from the external device, wherein the one or more measurements of code included in the generated compound certificate are usable by the external device to determine whether the computing device is in a trusted state.

9. The method of claim 8 wherein the manufacturer certificate chained to the generated compound certificate is usable by the external device to determine whether the state of the computing device represented in the generated compound certificate is a trusted state.

10. The method of claim 8 wherein the manufacturer certificate chained to the generated compound certificate is usable by the external device to determine whether the state of the computing device represented in the generated compound certificate is a trusted state, the method further comprising:
establishing a secure communication channel with the external device, the state of the computing device represented in the generated compound certificate being trusted by the external device.

11. The method of claim 8 wherein the generated compound certificate is further chained to a device certificate, the device certificate including measurements of mutable code executable on the computing device, the measurements of the mutable code including at least measurements of code for executing a trusted execution environment.

12. The method of claim 8 wherein the generated compound certificate is further chained to a device certificate, the device certificate including a representation of hardware included in the computing device.

13. The method of claim 8 wherein the one or more measurements of code executable on the computing device are generated during a boot sequence of the computing device.

14. The method of claim 8 further comprising:
receiving, at the computing device, a payload including a device update, the payload transmitted to the computing device from the external device responsive to a determination by the external device that the computing device is in an untrusted state based on the generated compound certificate.

15. One or more tangible processor-readable storage device embodied with instructions for executing on one or more hardware processors and circuits of a computing device a process comprising:

storing, at the computing device, a manufacturer certificate in a secure memory of the computing device, the secure memory accessible by a trusted computing manager;

generating, on the computing device, one or more measurements of code executable on the computing device, the one or more measurements of code representing a state of the computing device;

generating, by a certificate authority embedded in the trusted computing manager at the computing device, a compound certificate, wherein the compound certificate includes the one or more measurements of code and is chained to at least the stored manufacturer certificate, wherein the stored manufacturer certificate is received from an external certificate authority and stored in the secure memory accessible by the trusted computing manager; and transmitting, by the computing device, the generated compound certificate to an external device, wherein the one or more measurements of code included in the generated compound certificate is usable by the external device to determine whether the computing device is in a trusted state.

16. The one or more tangible processor-readable storage device of claim 15 wherein the manufacturer certificate is usable by the external device to determine whether the state of the computing device represented in the generated compound certificate is a trusted state.

17. The one or more tangible processor-readable storage device of claim 15 wherein the manufacturer certificate chained to the generated compound certificate is usable by the external device to determine whether the state of the computing device represented in the generated compound certificate is a trusted state; and establishing a secure communication channel with the external device, the state of the computing device represented in the generated compound certificate being trusted by the external device.

18. The one or more tangible processor-readable storage device of claim 15 wherein the generated compound certificate is further chained to a device certificate, the device certificate including measurements of mutable code executable on the computing device, the measurements of the mutable code including at least measurements of code for executing a trusted execution environment.

19. The one or more tangible processor-readable storage device of claim 15 wherein the generated compound certificate is further chained to a device certificate, the device certificate including a representation of hardware included in the computing device.

20. The one or more tangible processor-readable storage device of claim 15, further comprising:

receiving, at the computing device, a payload including a device update, the payload transmitted to the computing device from the external device responsive to a determination by the external device that the computing device is in an untrusted state based on the generated compound certificate.

* * * * *